United States Patent [19]

Fukaya

[11] Patent Number: 4,942,325
[45] Date of Patent: Jul. 17, 1990

[54] ELECTRIC MOTOR

[75] Inventor: Katsuyoshi Fukaya, Aichi, Japan

[73] Assignee: Aisan Kogyo Kabushiki Kaisha, Aichi, Japan

[21] Appl. No.: 330,807

[22] Filed: Mar. 30, 1989

[30] Foreign Application Priority Data

Apr. 18, 1988 [JP] Japan .................................. 63-50865

[51] Int. Cl.$^5$ ............................................... H02K 1/12
[52] U.S. Cl. ..................................... 310/257; 310/42; 310/49 R; 310/89
[58] Field of Search ......... 310/257, 49 R, 89, 162–165, 310/156, 154, 40 MM, 42, 112, 258, 216, 218

[56] References Cited

U.S. PATENT DOCUMENTS

| | | |
|---|---|---|
| 2,417,195 | 3/1947 | Hargreaves . |
| 4,034,247 | 7/1977 | Wagensonner et al. . |
| 4,174,485 | 11/1979 | Soden et al. . |
| 4,333,026 | 6/1982 | Bock ..................................... 310/257 |
| 4,672,247 | 6/1987 | Madsen .............................. 310/49 R |
| 4,792,292 | 12/1988 | Torisawa ........................... 310/49 R |

Primary Examiner—R. Skudy
Attorney, Agent, or Firm—Oblon, Spivak, McClelland, Maier & Neustadt

[57] ABSTRACT

Disclosed is an electric motor having a stator structure including an assembly of first and second cup shaped members each having a circumferential surface portion in the form of a cylindrical wall having at a free end thereof a recess and a projection formed as an extension of the circumferential wall portion and first and second magnetic pole plates each having an annular plate-formed portion having a plurality of additional recesses formed along an outer circumferential edge thereof. The projection formed on the first cup shaped members is loosely engaged in one of the additional recesses formed in the first magnetic pole plate, force fitted in one of the additional recesses formed in the second magnetic pole plate and loosely engaged in one of the recesses formed in the second cup shaped member. The projection formed on the second cup shaped member is loosely engaged in one of the additional recesses formed in the second magnetic pole plate, force fitted in one of the additional recesses formed in the first magnetic pole plate and loosely engaged in one of the recesses formed in the first cup shaped member. The first and second cup shaped members and the first and second magnetic pole plates have a plurality of magnetic pole pieces formed in a concentrical relationship thereon.

6 Claims, 2 Drawing Sheets

ELECTRIC MOTOR

BACKGROUND OF THE INVENTION

1. Field of the Invention

This invention relates to an electric motor, and more particularly to an electric motor suitably applied as a stepping motor which includes a stator having a plurality of stator windings wound on bobbins and a rotor including a permanent magnet magnetized to provide north and south poles alternating on the periphery thereof in a predetermined angular spaced relationship in a circumferential direction around an axis thereof.

2. Description of the Prior Art

A stepping motor having a structure of snap-coupling a stator assembly in an integral relationship without the necessity of welding or some other retaining means is disclosed in U.S. Pat. No. 4,174,485. In accordance with the structure, an electric motor includes a stator having a first cup shaped member having an annular wall which is disposed substantially in a perpendicularly relationship to the axis of the rotor, a circumferential surface portion extending from an outer peripheral edge of the annular wall and disposed in a substantially concentrical relationship with the axis, a plurality of magnetic pole pieces extending from an inner peripheral edge of the annular wall and disposed in a spaced relationship by a predetermined angular distance around the axis, a plurality of tabs extending in the extending direction of the circumferential surface portion from a free end of the circumferential surface portion and a plurality of cooperatively dimensioned and configured recesses, and a second cup shaped member having an annular wall, a circumferential surface portion, a plurality of magnetic pole pieces, a plurality of tabs and recesses which are all configured similarly to those of the first cup shaped member. The width of an end portion of each of the tabs is greater than that at a base portion of each of the tabs at which the tab connects to the free end of the circumferential surface portion of each of the cup shaped members, and the inclination of a side edge of each tab is set to about one degree. Consequently, when the tabs of the first cup shaped member are connected to the recesses of the second cup shaped member and the tabs of the second cup shaped member are connected to the recesses of the first cup shaped member, the first and second cup shaped members are snap-coupled to each other due to interference between the tabs and the cooperating recesses because of the presence of the taper of about one degree. Accordingly, the first and second cup shaped members are formed into a single assembly without the necessity of welding or the use of some other additional fixing means between the first and second cup shaped members.

Each of the first and second cup shaped members has a plurality of additional recesses formed with an angularly spaced relationship therein. The electric motor further includes first and second magnetic pole plates each having a plurality of upright magnetic pole pieces disposed in a substantially parallel relationship to the axis of the rotor on an inner peripheral edge of a planar annular member, and a plurality of tabs formed with a predetermined angularly spaced relationship in a plane of the planar annular member on an outer peripheral edge thereof and dimensioned and configured such that they may fit in the additional recesses formed in the first and second cup shaped members. Thus, priorr to snap-coupling of the first and second cup shaped members to each other, stator windings are installed and secured in annular spacings between the circumferential surface portions of the first and second cup shaped members and the magnetic pole plates, and then the tabs formed in the planes of the planar annular members of the first and second magnetic pole plates on the outer peripheral edge thereof are snugly fitted in the additional recesses of the first and second cup shaped members to assemble the first and second magnetic pole plates to the individual cup shaped members, thereby attaining snap-coupling of the first and second cup shaped members and forming a single stator assembly.

With the structure of the stator assembly, the tabs formed on the first magnetic pole plate are snugly fitted in the additional recesses of the first cup shaped member. Accordingly, the magnetic pole pieces formed on the first cup shaped member and the magnetic pole pieces formed on the first magnetic pole plate are prevented from relative movement in the angular direction around the axis of the rotor due to the snug fitting of the tabs and recesses. Meanwhile, the magnetic pole pieces formed on the second cup shaped member and the magnetic pole pieces formed on the second magnetic pole plate are prevented from relative angular movement around the axis of the rotor due to the snug fitting of the tabs and recesses. Subsequently, the plurality of tabs extending in the extending direction of the circumferential surface portion from the free end of the circumferential surface portion of the first cup shaped member are bound in the recesses formed at the free end of the circumferential surface portion of the second cup shaped member due to mutual interference by the snap-coupling as described above. Meanwhile, the plurality of tabs extending in the extending direction of the circumferential surface portion from the free end of the circumferential surface portion of the second cup shaped member are bound in the recesses formed at the free end of the circumferential surface portion of the first cup shaped member due to mutual interference by the snap-coupling as described above. Accordingly, angular movement of the rows of the magnetic pole pieces formed on the second cup shaped member and the second magnetic pole plate relative to the rows of the magnetic pole pieces formed on the first cup shaped member and the first magnetic pole plate around the axis of the rotor is prevented by the snap-coupling described above. With the structure described above, positioning of the magnetic pole plates is achieved at two stages in this manner.

Meanwhile, snap-coupling in binding the individual tabs of the first and second cup shaped members in the recesses of the second and first cup shaped members by mutual interference utilizing the negative taper of about one degree of the side edges of the tabs is established by pushing the tabs in the direction of the axis of the rotor into the recesses. The binding force at the connecting portions bound by the snap-coupling depends upon the thickness of material of the circumferential surface portions of the cup shaped members on and in which the tabs and the recesses are formed and also the residual distortion stress upon binding by interference.

In a stepping motor which is normally produced, the tabs are apt to be coupled in an outwardly or inwardly displaced condition in a radial direction with respect to recesses because the first and second cup shaped members have a thickness of material of 1 mm or so. Accordingly, there is the possibility that magnetic pole pieces formed on the first and second cup shaped members may be located in an eccentric relationship from each other with respect to the axis of the rotor after coupling of the first and second cup shaped members or may be angularly displaced out of a predetermined angularly equidistantly spaced relationship with respect to the axis of the rotor. After construction of a stepping motor, the eccentricity of the magnetic pole pieces will cause a problem in that the magnetic pole pieces may interfere with the rotor, resulting in incomplete operation of the motor. To the contrary, the angular displacement of the magnetic pole pieces will cause another problem in that the error in stepping angle may increase so as to deteriorate the resulting accuracy. Where a coating of resin material is molded on an outside of the stator structure, those problems are more significant on account of the influence of heat.

Further, since the side edges of the tabs having a negative taper are bound with the side edges of the recesses by mutual interference upon snap-coupling between the first and second cup shaped members, a the extent of press fitting required is great. Accordingly, the binding portions of the cup shaped members are readily scraped so as to cause chips to be formed. Such chips will cause a problem in that, if they enter the inside of the cup shaped members, they may stick to a surface of the rotor due to magnetic force of the rotor so as to cause incomplete operation of the motor.

SUMMARY OF THE INVENTION

It is an object of the present invention to provide an electric motor having a stator construction which has extremely precisely positioned stator pole pieces.

It is another object of the present invention to provide an electric motor wherein, in constructing a single stator assembly by holding first and second magnetic pole plates each having a plurality of magnetic pole pieces formed thereon between end edge portions of circumferential surface portions of first and second cup shaped members each having a plurality of magnetic pole pieces formed thereon, a plurality of projections formed on the first and second cup shaped members serving as extensions extending in the direction of an axis from the end edge portions are closely engaged in recesses formed in the circumferential edge portions of the first and second magnetic pole plates by mutual interference so that the concentricity of the magnetic pole pieces relative to each other with the axis of the rotor and the equality of the angular distances of the magnetic pole pieces with respect to the axis may be assured by the engaging relationship and to assure a high assembling facility of the stator assembly.

An electric motor according to the present invention has first and second cup shaped members each having an annular bottom portion disposed substantially in a perpendicular relationship to an axis and centered at the axis, a circumferential surface portion in the form of a cylindrical wall connected to an outer circumferential edge of the bottom portion and extending in a concentrical relationship with the axis, and a plurality of magnetic pole pieces connected to an inner circumferential edge of the bottom portion and extending in a concentrical relationship with the axis in the same direction as the circumferential surface portion, the magnetic pole pieces being disposed in a predetermined angularly spaced relationship from each other around the axis; and first and second magnetic pole plates each having an annular plate-formed portion extending in a plane perpendicular to the axis, and a plurality of magnetic pole pieces connected to an inner circumferential edge of the plate-formed portion and disposed in a concentrical relationship with the axis and in the same predetermined angularly spaced relationship from each other around the axis so that the magnetic pole pieces may be positioned on a same cylindrical plane with the magnetic pole pieces formed on the first and second cup shaped members.

The magnetic pole pieces formed on the first magnetic pole plate are aligned between the magnetic pole pieces formed on the first cup shaped member while the magnetic pole pieces formed on the second magnetic pole plate are aligned between the magnetic pole pieces formed on the second cup shaped member, and the first and second magnetic pole plates are contacted with each other and assembled in a concentrical relationship together with the first and second cup shaped members with a pair of stator armatures disposed between the circumferential surface portions of the first and second cup shaped members and the magnetic pole pieces and with a magnetic rotor disposed in the inside of the aligned magnetic pole pieces for rotation around a center axis provided by the axis.

The circumferential surface portion of the first cup shaped member has formed at a free end thereof a plurality of first projections each of which is formed as an extension extending in the direction of the axis in an integral relationship from the circumferential surface portion and has a pair of opposite side edges extending in parallel to the axis, a plurality of end edge portions which extend in a plane perpendicular to the axis between the first projections, and a plurality of first recesses which are opened to the end edge portions between the first projection and each has a pair of opposite side edges extending in parallel to the axis.

The circumferential surface portion of the second cup shaped member has formed at a free end thereof a plurality of second projections each of which is formed as an extension extending in the direction of the axis in an integral relationship from the circumferential surface portion and has a pair of opposite side edges extending in parallel to the axis, the second projections being adapted to be fitted in the first recesses of the first cup shaped member, a plurality of end edge portions which extend in a plane perpendicular to the axis between the second projections, and a plurality of second recesses which are opened to the end edge portions between the second projections and each has a pair of opposite side edges extending in parallel to the axis, the second recesses being adapted to receive the first projections of the first cup shaped member therein.

The first magnetic pole plate is formed so that the outer circumferential edge of the plate-formed portion thereof has an outer diameter substantially equal to or a little greater than the outer diameter of the circumferential surface portion of the second cup shaped member and has formed therein a plurality of first additional recesses each of which has a pair of opposite side edges for engaging with the opposite side edges of a corresponding one of the first projections of the first cup shaped member to receive the first projection therein, and a plurality of second additional recesses at least one of which has a pair of opposite side edges for closely engaging with the opposite side edges of a corresponding one of the second projections of the second cup shaped member by mutual interference to receive the second projection therein by force fitting.

The second magnetic pole plate is formed such that the outer circumferential edge of the plate-formed portion thereof has an outer diameter substantially equal to or a little greater than the outer diameter of the circumferential surface portion of the first cup shaped member and has formed therein a plurality of third additional recesses each of which has a pair of opposite side edges for engaging with the opposite side edges of a corresponding one of the second projections of the second cup shaped member to receive the second projection therein, and a plurality of fourth additional recesses at least one of which has a pair of opposite side edges for closely engaging with the opposite side edges of a corresponding one of the first projections of the first cup shaped member by mutual interference to receive the first projection therein by force fitting.

In accordance with the present invention, the outer circumferential edge of the plate-formed portion of the first magnetic pole plate is contacted with the end edge portion of the circumferential surface portion of the first cup shaped member with the first projections of the first cup shaped member fitted in the first additional recesses formed in the plate-formed portion of the first magnetic pole plate so that the magnetic pole pieces of the first magnetic pole plate may be positioned on the inside of the circumferential surface portion of the first cup shaped member, and then the outer circumferential edge of the plate-formed portion of the second magnetic pole plate is contacted with the end edge portion of the circumferential surface portion of the second cup shaped member with the second projections of the second cup shaped member fitted in the third additional recesses formed in the plate-formed portion of the second magnetic pole plate so that the magnetic pole pieces of the second magnetic pole plate may be positioned on the inside of the circumferential surface portion of the second cup shaped member, whereafter the first projections of the first cup shaped member are force fitted into the fourth additional recesses formed in the plate-formed portion of the second magnetic pole plate and fitted into the second recesses of the second cup shaped member while at the same time the second projections of the second cup shaped member are force fitted into the second additional recesses formed in the plate-formed portion of the first magnetic pole plate and fitted into the first recesses of the first cup shaped member, thereby constructing a single assembly of the first and second cup shaped members and the first and second magnetic pole plates. The first projections of the first cup shaped member extend through the first additional recesses of the first magnetic pole plate to the fourth additional recesses of the second magnetic pole plate, and at least one of the first projections is force fitted at the opposite side edges thereof between the opposite side edges of a corresponding one of the fourth additional recesses by mutual interference while the second projections of the second cup shaped member extend through the third additional recesses of the second magnetic pole plate to the second additional recesses of the first magnetic pole plate, and at least one of the second projections is force fitted at opposite side edges thereof between the opposite side edges of a corresponding one of the second additional recesses by mutual interference. Accordingly, the assembly of the two cup shaped members and the two magnetic pole plates has an integral relationship by coupling force of the press fitting, and construction of the assembly can be maintained by the coupling force.

In accordance with the present invention, the opposite side edges of each of the first and second projections and the first and second recesses formed on and in the first and second cup shaped members, respectively, extend parallel to the axis, and the first and third additional recesses formed in the plate-formed portions of the first and second magnetic pole plates are adapted to fit opposite side edges thereof with opposite side edges of the first and second projections to receive the projections therein. Accordingly, by fitting the first projections of the first cup shaped members in the corresponding first additional recesses formed in the first magnetic pole plate, the equality of the angular distances with respect to the axis wherein the magnetic pole pieces disposed on the first cup shaped member and the magnetic pole pieces disposed on the first magnetic pole plate are arranged in an alternate relationship on a same circumference centered at the axis and the concentricity wherein the magnetic pole pieces are aligned in a concentrical relationship on the same circumference centered at the axis are assured. Further, by fitting the second projections of the second cup shaped members in the corresponding third additional recesses formed in the second magnetic pole plate, the equality of the angular distances with respect to the axis wherein the magnetic pole pieces disposed on the second cup shaped member and the magnetic pole pieces disposed on the second magnetic pole plate are arranged in an alternate relationship on the same circumference centered at the axis and the concentricity wherein the magnetic pole pieces are aligned in a concentrical relationship on the same circumference centered at the axis are assured. When the first projections and the second projections are fitted into the second recesses and the first recesses formed on and in the first and second cup shaped members, respectively, the projections are fitted into the corresponding recesses without special binding force due to mutual fitting engagement of the opposite side edges of the projections and the recesses which all extend parallel to the axis. Further, due to the fitting engagement between the opposite side edges with each other, the anticipated relationship in angular distance with respect to the axis between the magnetic pole pieces disposed on the first cup shaped member and the magnetic pole pieces disposed on the second cup shaped member can be assured and alignment of the magnetic pole pieces on the same cylindrical plane centered at the axis can be assured. Furthermore, for force fitting between the first projections of the first cup shaped member and the fourth additional recesses of the second magnetic pole plate and for force fitting between the second projections of the second cup shaped member and the second additional recesses of the first magnetic pole plate, the outer diameter of the outer circumferential edge of the plate-formed portion of the second magnetic pole plate is made substantially equal to or a little greater than the outer diameter of the circumferential surface portion of the first cup shaped member while the outer diameter of the outer circumferential edge of the plate-formed portion of the first magnetic pole plate is made substantially equal to or a little greater than the outer diameter of the circumferential surface portion of the second cup shaped member. Accordingly, opposite side edges of the fourth additional recesses in which the first projections are to be force fitted and the second additional recesses in which the second projections are to be force fitted can be formed sufficiently on the plate-formed portions of the individual magnetic pole plates, and the additional recesses that are sufficiently closely engaged with the projections by mutual interference between the opposite side edges thereof to attain force fitting can be formed. Further, upon assembly by force fitting, opposite side edges at end portions of the first projections of the first cup shaped member are fitted with corresponding opposite side edges of the second recesses of the second cup shaped member while opposite side edges at end portions of the second projections of the second cup shaped member are fitted with corresponding opposite side edges of the first recesses of the first cup shaped member so that the first and second cup shaped members are guided in parallel to the axis with each other. Accordingly, even if the opposite side edges of the additional recesses thus force fitted were resiliently deformed at different degrees, the first and second cup shaped members can be moved toward each other along the axis and fastened to each other, then the concentricity of the magnetic pole pieces disposed on the first and second cup shaped members will not be disturbed, and moreover chips which may appear upon force fitting can be minimized.

In accordance with the present invention, where the first additional recesses formed in the plate-formed portion of the first magnetic pole plate are closely engaged at the opposite side edges thereof with the opposite side edges of the first projections of the first cup shaped member by mutual interference to receive the first projections therein by force fitting while the third additional recesses formed in the plate-formed portion of the second magnetic pole plate are closely engaged at the opposite side edges thereof with the opposite side edges of the second projections of the second cup shaped member by mutual interference to receive the second projections therein by force fitting, the coupling strength of the stator assembly is further increased.

Further, since opposite side edged of the first and second projections of the first and second cup shaped members are formed parallel to the center axis of rotation of the rotor armature, where each of those additional recesses which are adapted to closely engage with the opposite side edges of the first or second projections by mutual interference to receive therein the projections by force fitting is dimensioned so that the distance between the opposite side edges of the additional recesses along a circumference centered at the axis is made smaller by a very small dimension than the distance along the circumference between the opposite side edges of the corresponding projection to be engaged in the additional recess, retaining force due to residual distortion is produced between the side edges which are engaged with each other due to the difference of the very small dimension upon force fitting, and production of chips upon force fitting can be minimized.

In addition, where each of the first additional recesses formed in the plate-formed portion of the first magnetic pole plate has a bottom edge extending between the opposite side edges thereof and formed in an arc which is centered at the axis and has a same radius as the radius of inner circumferential faces of the first projections of the first cup shaped member, when the first projections of the first cup shaped member are fitted into the first additional recesses of the first magnetic pole plate, the bottom edge of the first additional recesses is contacted with the first projections so that positioning of the first magnetic pole plate with respect to the first cup shaped member can be accurate together with the fitting of the opposite side edges of the first additional recesses and the first projections. Accordingly, maintenance in angular distance with A respect to the axis between the magnetic pole pieces disposed on the first cup shaped member and the magnetic pole pieces disposed on the first magnetic pole plate and the concentricity of the magnetic pole pieces around the axis can be made more accurate. Also where each of the third additional recesses formed in the plate-formed portion of the second magnetic pole plate has a bottom edge extending between the opposite side edges thereof and formed in an arc which is centered at the axis and has the same radius as the radius of inner circumferential faces of the second projections of the second cup shaped member, similar effects can be exhibited in the relationship between the magnetic pole pieces disposed on the second cup shaped member and the magnetic pole pieces disposed on the second magnetic pole plate.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DESCRIPTION OF THE PREFERRED EMBODIMENT

Figure 1:
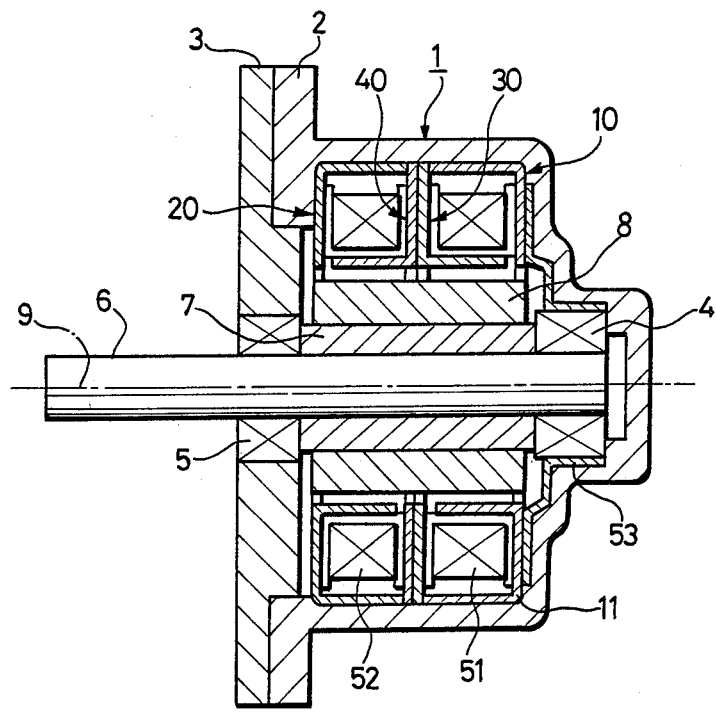
FIG. 1 is a sectional view of an electric motor showing a preferred embodiment of the present invention.

Referring to FIG. 1, there is shown in a sectional view a stepping motor to which the present invention is applied. The stepping motor shown includes a housing body 2 formed by monoblock molding of a structural synthetic resin material and having a stator assembly 1 secured thereto, a lid member 3 secured to an open end of the housing body 2, and a rotor 7 secured to an output power shaft 6 which is supported for rotation on the housing body 2 and lid member 3 by means of a pair of bearings 4 and 5. The rotor 7 includes a permanent magnet 8 having a plurality of north and south magnetic poles magnetized alternating on an outer periphery thereof. It is to be noted that reference numeral 9 in FIG. 1 denotes a center axis of rotation of the output power shaft 6.

Figure 2:
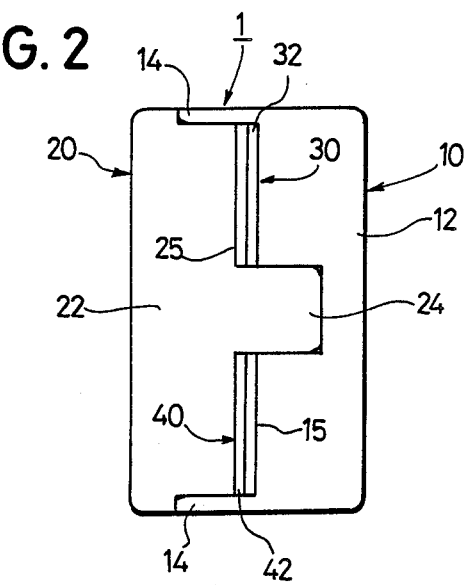
FIG. 2 is a front elevational view of a stator assembly of the electric motor shown in FIG. 1.
Figure 3:
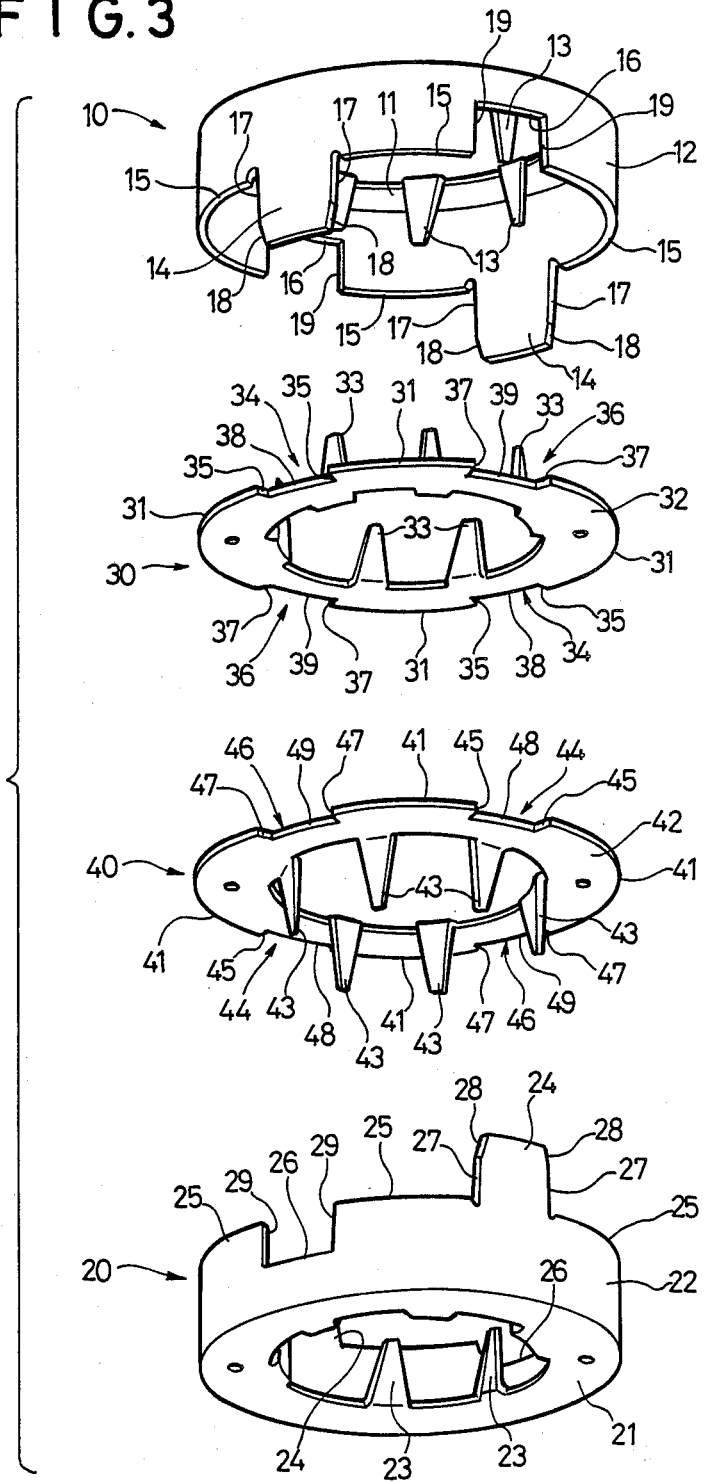
FIG. 3 is a fragmentary perspective view of the stator assembly shown in FIG. 2.

The stator assembly 1 includes, as also seen from the front elevational view and fragmentary perspective view of FIGS. 2 and 3, a first cup shaped member 10, a second cup shaped member 20, a first magnetic pole plate 30 and a second magnetic pole plate 40 which are all assembled into a unitary construction.

The first cup shaped member 10 is formed as a single member from a single plate-formed material by press work and includes an annular bottom portion 11 disposed substantially in a perpendicular relationship to the center axis 9 and centered at the center axis 9, a circumferential surface portion 12 in the form of a cylindrical wall connected to an outer circumferential edge of the bottom portion 11, centered at the center axis 9 and having a substantially the same diameter with a circumferential wall portion 22 of the second cup shaped member 20, and a plurality of magnetic pole pieces 13 connected to an inner circumferential edge of the bottom portion 11, disposed in a predetermined angularly spaced relationship from each other around the center axis 9 and each having a surface of a substantially truncated triangular shape. The magnetic pole pieces 13 extend in parallel to the circumferential wall portion 12 of the first cup shaped member 10 in the same direction from the bottom portion 11 and in a concentrical relationship with the center axis 9.

A plurality of first projections 14 are formed in an integral relationship at a free end of the circumferential surface portion 12 of the first cup shaped member 10 as extensions which extend parallel to the center axis 9. End edges 15 are thus defined between the first projections 14 at the free end of the circumferential surface portion 12 of the first cup shaped member 10 and are disposed in a plane perpendicular to the center axis 9. A plurality of first recesses 16 are further formed along the free end of the circumferential surface portion 12 of the first cup shaped member 10 so that they are opened to the end edges 15. In the case of the electric motor shown, the first cup shaped member 10 has up to two first projections 14 which are formed at a pair of positions spaced by an angular distance of 180 degrees with respect to the center axis 9 and extend from the end edges 15 of the circumferential surface portion 12 so that opposite side edges of the first projections 14 extend parallel to the center axis 9 so that the first projections 14 each present a rectangular shape in a front elevational view thereof. The side edges 17 of the projections 14 are cut obliquely at corners at free ends thereof to form chamfered portions 18, and sections of the projections 14 in a plane perpendicular to the center axis 9 make part of the circle defined by a section of the circumferential surface portion 12 in another plane perpendicular to the center axis 9. The first recesses 16 are each partially defined by a pair of opposite side edges 19 extending parallel to the center axis 9 and are opened to the end edges 15. The first recesses 16 thus each present a generally rectangular shape and are formed at locations spaced by an angular distance of 180 degrees with respect to the center axis 9 between the first projections 14.

The second cup shaped member 20 is formed as a single member from a single plate-formed material by press work and includes an annular bottom portion 21 disposed substantially in a perpendicular relationship to the center axis 9 and centered at the center axis 9, a circumferential surface portion 22 in the form of a cylindrical wall connected to an outer circumferential edge of the bottom portion 21, centered at the center axis 9 and having substantially the same diameter with the circumferential wall portion 12 of the first cup shaped member 10, and a plurality of magnetic pole pieces 23 connected to an inner circumferential edge of the bottom portion 21, disposed in a predetermined angularly spaced relationship from each other around the center axis 9 and each having a surface of a substantially truncated triangular shape. The magnetic pole pieces 23 extend in parallel to the circumferential wall portion 22 of the second cup shaped member 20 in the same direction from the bottom portion 21 and in a concentrical relationship with the center axis 9. In FIG. 3, the first and second cup shaped members 10 and 20 are shown as having up to six magnetic pole pieces 13 and 23 formed thereon, respectively. In particular, the six magnetic pole pieces 13 and 23 are formed at angular intervals of 60 degrees around the center axis 9 on the inner circumferential edges of the bottom portions 11 and 21 of the first and second cup shaped members 10 and 20, respectively, and the magnetic pole pieces 13 formed on the first cup shaped member 10 and the magnetic pole pieces 23 formed on the second cup shaped members 20 are disposed so that they may be located on the same circumference with respect to the center axis 9.

A plurality of second projections 24 are formed with an integral relationship at a free end of the circumferential surface portion 22 of the second cup shaped member 20 as extensions which extend in parallel to the center axis 9. End edges 24 are thus defined between the second projections 24 at the free end of the circumferential surface portion 22 of the second cup shaped portion 20 and are disposed in a plane perpendicular to the center axis 9. A plurality of second recesses 26 are further formed along the free end of the circumferential surface portion 22 of the second cup shaped member 20 so that they are opened to the end edges 25. In assembly of the stator assembly, the second projections 24 formed on the second cup shaped member 20 are fitted into the first recesses 16 of the first cup shaped member 10 while the second recesses 26 of the second cup shaped member 20 receive the first projections 14 of the first cup shaped member 10 therein. Accordingly, up to two second projections 24 are formed at a pair of locations spaced by an angular distance of 180 degrees with respect to the center axis 9 and extend from the end edges 25 of the circumferential surface portion 22 such that the opposite side edges of the second projections 24 extend parallel to the center axis 9 so that the second projections 24 each present a rectangular shape in front elevation thereof and sections of the projections 24 in a plane perpendicular to the center axis 9 make part of a circle defined by a section of the circumferential surface portion 22 in another plane perpendicular to the center axis 9. A pair of chamfered portions 28 are formed at a free end of each of the second projections 24 by obliquely cutting the opposite corners of the projection 24 similarly to the first projections 14. The second recesses 26 are each partially defined by a pair of opposite side edges 29 extending parallel to the center axis 9 and are opened to the end edges 25. The second recesses 26 thus each present a generally rectangular shape and are formed at a pair of positions spaced by an angular distance of 180 degrees with respect to the center axis 9 between the second projections 24. The distances between opposite side edges 27 of each of the second projections 24 and between opposite side edges 29 of each of the second recesses 26 along the circumferential direction of the circumferential surface portion 22 of the second cup shaped member 20 are made equal to the distance between opposite side edges 19 of each of the first recesses 16 and the distance between opposite side edges 17 of each of the first projections 14 along the circumferential direction of the circumferential surface portion 12 of the first cup shaped member 10 so that the projections may be removably fitted in the recesses without presenting a gap between each opposing side edge of them. To this end, the difference between the radius of the inner circumferential face of the circumferential surface portion 12 of the first cup shaped member 10 and the radius of the inner circumferential face of the circumferential surface portion 22 of the second cup shaped member 20 with respect to the center axis 9 must be only within the dimension of a thickness of material of the circumferential surface portions 12 and 22 of the first and second cup shaped members 10 and 20, and preferably the inner circumferential faces are formed with the same diameter.

The first magnetic pole plate 30 is formed from a single plate-formed material by press work and includes an annular plate-formed portion 32 disposed in a plane perpendicular to the center axis 9 and having an outer circumferential edge 31 which has an outer diameter substantially equal to or a little greater than the outer diameter of the circumferential surface portion 22 of the second cup shaped member 20, and six magnetic pole pieces 33 connected to an inner circumferential edge of the plate-formed portion 32 and disposed in a spaced relationship by an angle of 60 degrees from each other in a cylindrical plane concentrical with the center axis 9. Each of the magnetic pole pieces 33 has a surface of a substantially truncated triangular shape. The outer circumferential edge 31 of the plate-formed portion 32 is cut at two locations thereof spaced by an angle of 180 degrees with respect to the center axis 9 to form two first additional recesses 34 for receiving the first projections 14 of the first cup shaped member 10. The first additional recesses 34 are each formed so that the distance between the opposite side edges 35 thereof along a circumference centered at the center axis 9 is substantially equal to the distance between the opposite side edges 17 of each of the first projections 14 on a circumference centered at the center axis 9 so that the first projections 14 may be removably fitted in the first additional recesses 34 and the first magnetic pole plate 30 may be prevented from rotating relative to the first cup shaped member 10 around the center axis 9. More particularly, the distance between the opposite side edges 35 of each of the first additional recesses 34 is designed so as to be equal to the distance between the opposite side edges 17 of each of the first projections 14, and as a working tolerance for production, the working tolerance as a distance between the opposite side edges 35 of each of the first additional recesses 34 is set so as to be greater by a very small dimension than the working tolerance in distance between the opposite side edges 17 of each of the first projections 14. When the plate-formed portion 32 of the first magnetic pole plate 30 is contacted with the end edges 15 of the circumferential surface portion 12 of the first cup shaped member 10 with the first projections 14 of the first cup shaped member 10 fitted in the first additional recesses 34 of the first magnetic pole plate 30, the magnetic pole pieces 33 formed on the first magnetic pole plate 30 and the magnetic pole pieces 13 formed on the first cup shaped member 10 are positioned alternately in a spaced relationship by an angle of 30 degrees with respect to the center axis 9 on the same circumference with the first magnetic pole pieces 13. The outer circumferential edge 31 of the plate-formed portion 32 of the first magnetic pole plate 30 further has two second additional recesses 36 formed at two locations thereof spaced by an angle of 180 degrees from each other and spaced by an angle of 90 degrees from the locations of the first additional recesses 34 with respect to the center axis 9 for closely engaging with the second projections 24 of the second cup shaped member 20. The second additional recesses 36 are each formed so that the distance between the opposite side edges 37 thereof along a circumference centered at the center axis 9 is made substantially smaller by a very small dimension than the distance between the opposite side edges 27 of each of the second projections 24 on a circumference centered at the center axis 9 so that the opposite side edges 27 of each of the second additional projections 24 may be closely engaged with the opposite side edges 37 of each of the second additional recesses 36 by interference between them. More particularly, the distance between the opposite side edges 37 of each of the second additional recesses 34 is designed to be equal to the distance between the opposite side edges 27 of each of the second projections 24, and as a working tolerance for production, the working tolerance in distance between the opposite side edges 37 of each of the second additional recesses 36 is set so as to be smaller by a very small dimension than the designed dimension, and/or the working tolerance in distance between the opposite side edges 27 of each of the second projections 24 is set greater by a very small dimension than the designed dimension. Due to such measures, when the second projections 24 of the second cup shaped member 20 are fitted in the second additional recesses 36 of the first magnetic pole plate 30, the side edges 27 of the second projections 24 are force fitted with the side edges 37 of the second additional recesses 36 by mutual interference between them, and the side edges 27 and 37 are engaged so closely with each other due to residual distortion by the force fitting therebetween that they cannot be spaced from each other by small external force. Bottom edges 38 extending between the opposite side edges 35 of the first additional recesses 34 are formed in arcs extending on a circumference centered at the center axis 9 and having a radius substantially equal to the radius of inner circumferential faces of the first projections 14 of the first cup shaped member 10 centered at the center axis 9. Consequently, when the first projections 14 are fitted in the first additional recesses 34, the concentricity between the magnetic pole pieces 13 and 33 with respect to the center axis 9 is assured, and equality in angular distance between the magnetic pole pieces is assured. Further, if bottom edges 39 extending between the opposite side edges 37 of the second additional recesses 36 were formed in arcs extending on a circumference centered at the center axis 9 and having a radius substantially equal to the radius of inner circumferential faces of the second projections 24 of the second cup shaped member 20 centered at the center axis 9, then the concentricity between the magnetic pole pieces 33 of the first magnetic plate 30 and the magnetic pole pieces 23 of the second cup shaped member 20 with respect to the center axis 9 and the equality in angular distance between the magnetic pole pieces are assured at the same time. However, the radius of the bottom edges 39 may otherwise be smaller than the radius of the inner circumferential faces of the second projections 24.

The second magnetic pole plate 40 is formed from a single plate-formed material by press work and includes an annular plate-formed portion 42 disposed in a plane perpendicular to the center axis 9 and having an outer circumferential edge 41 which has an outer diameter substantially equal to or a little greater than the outer diameter of the circumferential surface portion 12 of the first cup shaped member 10, and six magnetic pole pieces 43 connected to an inner circumferential edge of the plate-formed portion 42 and disposed in a spaced relationship by an angle of 60 degrees from each other in a cylindrical plane concentrical with the center axis 9. Each of the magnetic pole pieces 43 has a surface of a substantially truncated triangular shape. The outer circumferential edge 41 of the plate-formed portion 42 is cut at two locations thereof spaced by an angle of 180 degrees with respect to the center axis 9 to form two third additional recesses 44 for receiving the second projections 24 of the second cup shaped member 20 therein. The third additional recesses 44 are each formed so that the distance between the opposite side edges 45 thereof along a circumference centered at the center axis 9 is substantially equal to the distance between the opposite side edges 27 of each of the second projections 24 on a circumference centered at the center axis 9 so that the second projections 24 may be removably fitted in the third additional recesses 44 and the second magnetic pole plate 40 may be prevented from rotating relative to the second cup shaped member 20 around the center axis 9. More particularly, the distance between the opposite side edges 45 of each of the third additional recesses 44 is designed equal to the distance between the opposite side edges 27 of each of the second projections 24, and as a working tolerance for production, the working tolerance distance between the opposite side edges 45 of each of the third additional recesses 44 is set so as to be greater by a very small dimension than the working tolerance in distance between the opposite side edges 27 of each of the second projections 24. When the plate-formed portion 42 of the second magnetic pole plate 40 is contacted with the end edges 25 of the circumferential surface portion 22 of the second cup shaped member 20 with the second projections 24 of the second cup shaped member 20 fitted in the third additional recesses 44 of the second magnetic pole plate 40, the magnetic pole pieces 43 formed on the second magnetic pole plate 40 and the magnetic pole pieces 23 formed on the second cup shaped member 20 are positioned alternately in a spaced relationship by an angle of 30 degrees with respect to the center axis 9 on the same circumference with the second magnetic pole pieces 23. The outer circumferential edge 41 of the plate-formed portion 42 of the second magnetic pole plate 40 further has two fourth additional recesses 46 formed at two locations thereof spaced by an angle of 180 degrees from each other and spaced by an angle of 90 degrees from the locations of the third additional recesses 44 with respect to the center axis 9 for closely engaging with the first projections 14 of the first cup shaped member 10. The fourth additional recesses 46 are each formed such that the distance between the opposite side edges 47 thereof along a circumference centered at the center axis 9 is made substantially smaller by a very small dimension than the distance between the opposite side edges 17 of each of the first projections 14 on a circumference centered at the center axis 9 so that the opposite side edges 17 of each of the first projections 14 may be closely engaged with the opposite side edges 47 of each of the fourth additional recesses 46 by mutual interference between them. More particularly, the distance between the opposite side edges 47 of each of the fourth additional recesses 46 is designed so as to be equal to the distance between the opposite side edges 17 of each of the first projections 14, and as a working tolerance for production, the working tolerance in distance between the opposite side edges 47 of each of the fourth additional recesses 46 is set so as to be smaller by a very small dimension than the designed dimension, and/or the working tolerance in distance between the opposite side edges 17 of each of the first projections 14 is set so as to be greater by a very small dimension than the designed dimension. Due to these measures, when the first projections 14 of the first cup shaped member 10 are fitted in the fourth additional recesses 46 of the second magnetic pole plate 40, the side edges 17 of the first projections 14 are force fitted with the side edges 47 of the fourth additional recesses 46 by mutual interference between them, and the side edges 17 and 47 are engaged so closely with each other due to residual distortion by the force fitting therebetween that they cannot be spaced from each other by a small external force. Bottom edges 48 extending between the opposite side edges 45 of the third additional recesses 44 are formed in arcs extending on a circumference centered at the center axis 9 and having a radius substantially equal to the radius of inner circumferential faces of the second projections 24 of the second cup shaped member 20 centered at the center axis 9. Consequently, when the second projections 24 are fitted in the third additional recesses 44, the concentricity between the magnetic pole pieces 23 and 43 with respect to the center axis 9 is assured, and the equality in angular distance between the magnetic pole pieces are assured. Further, if bottom edges 49 extending between the opposite side edges 47 of the fourth additional recesses 46 were formed in arcs extending on a circumference centered at the center axis 9 and having a radius substantially equal to the radius of inner circumferential faces of the first projections 14 of the first cup shaped member 10 centered at the center axis 9, then the concentricity between the magnetic pole pieces 43 of the second magnetic plate 40 and the magnetic pole pieces 13 of the first cup shaped member 10 with respect to the center axis 9 and the equality in angular distance between the magnetic pole pieces are assured at the same time. However, the radius of the bottom edges 49 may otherwise be smaller than the radius of the inner circumferential faces of the first projections 14.

A plurality of stator coils 51 and 52 each having a stator winding wound on a bobbin therein are placed into an annular spacing between the circumferential surface portion 12 and the magnetic pole pieces 13 of the first cup shaped member 10 and another annular spacing between the circumferential surface portion 22 and the magnetic pole pieces 23 of the second cup shaped member 20, respectively. Then, the plate-formed portion 32 of the first magnetic pole plate 30 is contacted with the end edge portions 15 of the circumferential surface portion 12 of the first cup shaped member 10 with the first projections 14 of the first cup shaped member 10 fitted in the first additional recesses 34 of the first magnetic pole plate 30, and then the plate-formed portion 42 of the second magnetic pole plate 40 is contacted with the end edge portions 25 of the circumferential surface portion 22 of the second cup shaped member 20 with the second projections 24 of the second cup shaped member 20 fitted in the third additional recesses 44 of the second magnetic pole plate 40. Subsequently, the second projections 24 of the second cup shaped member 20 are force fitted into the second additional recesses 36 of the first magnetic pole plate 30 and fitted into the first recesses 16 of the first cup shaped member 10 while at the same time the first projections 14 of the first cup shaped member 10 are force fitted into the fourth additional recesses 46 of the second magnetic pole plate 40 and fitted into the second recesses 26 of the second cup shaped member 20, thereby obtaining such a stator assembly as shown in FIG. 2. The stator assembly thus obtained is provided with an assembling force that will not allow the assembly to be disassembled by small external force owing force fitting between the side edges 17 of the first projections 14 and the side edges 47 of the fourth additional recesses 46 and owing to force fitting between the side edges 17 of the second projections 24 and the side edges 37 of the second additional recesses 36.

Then, a bearing retaining member 53 for retaining the bearing 4 thereon is secured to a main portion of the bottom portion 11 of the first cup shaped member 10 of the thus assembled stator assembly 1 in a manner as shown in FIG. 1, and then the stator assembly 1 is placed into a mold of an injection molding machine in order to secure a housing body 2 formed by injection molding of a structural synthetic resin material to an outer side face of the bearing retaining member 53, the remaining portion of the bottom portion 11 and an entire outer surface of the circumferential surface portion 12 of the first cup shaped member 10, and an entire surface of the circumferential surface portion 22 and a circumferential edge portion of the bottom portion 21 of the second cup shaped member 20. Afterwards, a lid member 3 which is to be secured to the housing body 2 by fastening means such as a bolt and a nut is prepared, and an output power shaft 6 of the rotor 7 is supported for rotation by means of the bearings 4 and 5 so that an outer circumferential surface of the permanent magent 8 of the rotor 7 may be spaced from the magnetic pole pieces 13, 23, 33 and 43 by a small distance in a radial direction with respect to the center axis 9, thereby completing the stepping motor.

With the embodiment described above, the stator assembly can be constituted from the first and second cup shaped members 10 and 20 which are configured and dimensioned in quite the same manner and the first and second magnetic pole plates 30 and 40 which are also configured and dimensioned in quite the same manner. While in the present embodiment the two first projections 14 formed on the first cup shaped member 10 are described engaged with the fourth additional recesses 46 of the second magnetic pole plate 40 in interference by force fitting and the two second projections 24 formed on the second cup shaped member 20 are described engaged with the second additional recesses 36 of the first magnetic pole plate 30 in interference by force fitting, the stator assembly can be constructed by engaging any one of the first projections 14 and any one of the second projections 24 with corresponding ones of the fourth additional recesses 46 and the second additional recesses 36, respectively, in interference by force fitting. Further, while in the present embodiment the first projections 14 formed on the first cup shaped member 10 and the second projections 24 formed on the second cup shaped member 20 are described having a disengageable and engageable relationship to the first additional recesses 34 formed in the first magnetic pole plate 30 and the third additional recesses 44 formed in the second magnetic pole plate 40, respectively, apparently the fitting relationship between them may be an engaging relationship in interference by force fitting as described above.

It is to be noted that, while in the present embodiment the first projections 14 and the first recesses 16 formed on and in the first cup shaped member 10 are described formed at symmetrical locations with respect to the center axis 9 of rotation of the output power shaft 6, they need not necessarily be provided at the symmetrical locations with respect to the center axis 9 and may be formed at such relative locations that the first projections 14 formed on the first cup shaped member 10 are fitted in a conforming relationship in the first and fourth additional recesses 34 and 46 formed in the first and second magnetic pole plates 30 and 40, respectively, and also in the second recesses 26 formed in the second cup shaped member 20 while the second projections 24 formed on the second cup shaped member 20 are fitted in a conforming relationship in the second and third additional recesses 36 and 44 formed in the first and second magnetic pole plates 30 and 40, respectively, and also in the first recesses 16 formed in the first cup shaped member 10. Further, the number of the projections 14 and 24 and the recesses 16 and 26 formed on and in the first and second cup shaped members 10 and 20, respectively, need not necessarily be limited to two.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric motor which comprises:

first and second cup shaped members each having an annular bottom portion disposed substantially in a perpendicular relationship to an axis and centered at the axis, a circumferential surface portion having a cylindrical wall connected to an outer circumferential edge of said bottom portion and extending in a concentrical relationship with the axis, and a plurality of magnetic pole pieces connected to an inner circumferential edge of said bottom portion and extending in a concentrical relationship with the axis in the same direction as said circumferential surface portion, said magnetic pole pieces being disposed in a predetermined angularly spaced relationship from each other around the axis, and first and second magnetic pole plates each having an annular plate-formed portion extending in a plane perpendicular to the axis, and a plurality of magnetic pole pieces connected to an inner circumferential edge of said plate-formed portion and disposed in a concentrical relationship with the axis and in the same predetermined angularly spaced relationship from each other around the axis, said magnetic pole pieces being positioned on the same cylindrical plane with said magnetic pole pieces formed on said first and second cup shaped members, wherein said magnetic pole pieces provided on said first magnetic pole plate are aligned between said magnetic pole pieces provided on said first cup shaped member while said magnetic pole pieces provided on said second magnetic pole plate are aligned between said magnetic pole pieces provided on said second cup shaped member, and wherein said first and second magnetic pole plates contact each other and are assembled in concentrical relationship together with said first and second cup shaped members with a pair of stator armatures disposed between said circumferential surface portions of said first and second cup shaped members and said magnetic pole pieces and with a rotor armature disposed in the inside of said aligned magnetic pole pieces for rotation around a center axis provided by the axis, said circumferential surface portion of said first cup shaped member has formed at a free end thereof a plurality of first projections each of which is formed as an extension extending in the direction of the axis in an integral relationship from said circumferential surface portion and has a pair of opposite side edges extending parallel to the axis, a plurality of end edge portions which extend in a plane perpendicular to the axis between said first projections, and a plurality of first recesses which are opened to said end edge portions between said first projections and each of which has a pair of opposite side edges extending parallel to the axis, said circumferential surface portion of said second cup shaped member has formed at a free end thereof a plurality of second projections each of which is formed as an extension extending in the direction of the axis in an integral relationship from said circumferential surface portion and has a pair of opposite side edges extending parallel to the axis, said second projections being adapted to be fitted in said first recesses of said first cup shaped member, a plurality of end edge portions which extend in a plane perpendicular to the axis between said second projections, and a plurality of second recesses which are opened to said end edge portions between said second projections and each has a pair of opposite side edges extending parallel to the axis, said second recesses being adapted to receive said first projections of said first cup shaped member therein, said first magnetic pole plate is formed so that said outer circumferential edge of said plate-formed portion thereof has an outer diameter substantially equal to or smaller than the outer diameter of said circumferential surface portion of said second cup shaped member and has formed therein a plurality of first additional recesses each of which has a pair of opposite side edges for engaging with the opposite side edges of a corresponding one of said first projections of said first cup shaped member to receive the first projection therein, and a plurality of second additional recesses at least one of which has a pair of opposite side edges for closely engaging with the opposite side edges of a corresponding one of said second projections of said second cup shaped member by mutual interference to receive the second projection therein by force fitting, and wherein said second magnetic pole plate is formed so that said outer circumferential edge of said plate-formed portion thereof has an outer diameter substantially equal to or slightly greater than the outer diameter of said circumferential surface portion of said first cup shaped member and has formed therein a plurality of third additional recesses each of which has a pair of opposite side edges for engaging with the opposite side edges of a corresponding one of said second projections of said second cup shaped member to receive the second projection therein, and a plurality of fourth additional recesses at least one of which has a pair of opposite side edges for closely engaging with the opposite side edges of a corresponding one of said first projections of said first cup shaped member by mutual interference to receive the first projection therein by force fitting.

2. An electric motor according to claim 1, wherein at least one of said first additional recesses of said first magnetic pole plate is engaged at the opposite side edges thereof with the opposite side edges of the corresponding one of said first projections of said first cup shaped member by mutual interference to receive the first projection therein by force fitting, and at least one of said third additional recesses of said second magnetic pole plate is engaged at the opposite side edges thereof with the opposite side edges of the corresponding one of said second projections of said second cup shaped member by mutual interference to receive the second projection therein by force fitting.

3. An electric motor according to claims 1 or 2, wherein each of said additional recesses which are formed in the circumferential edge portions of said plate-formed portions of said first and second magnetic pole plates and are adapted to closely engage at the opposite side edges thereof with the corresponding ones of said second projections of said second cup shaped member and said first projections of said first cup shaped member by mutual interference to receive therein the second and first projections by force fitting, respectively, is dimensioned so that the distance between the opposite side edges thereof along a circumference centered at the axis is made smaller than the distance along the circumference between the opposite side edges of the corresponding projection to be engaged in said additional recess.

4. An electric motor according to claim 1, wherein each of said first additional recesses formed along the outer circumferential edge of said plate-formed portion of said first magnetic pole plate has a bottom edge extending between the opposite side edges thereof and formed in an arc which is centered at the axis and has the same radius as the radius of inner circumferential faces of said first projections of said first cup shaped member while each of said third additional recesses formed along the outer circumferential edge of said plate-formed portion of said second magnetic pole plate has a bottom edge extending between the opposite side edges thereof and formed in an arc which is centered at the axis and has the same radius as the radius of inner circumferential faces of said second projections of said second cup shaped member.

5. An electric motor according to claim 2, wherein each of said first additional recesses formed along the outer circumferential edge of said plate-formed portion of said first magnetic pole plate has a bottom edge extending between the opposite side edges thereof and formed in an arc which is centered at the axis and has the same radius as the radius of inner circumferential faces of said first projections of said first cup shaped member while each of said third additional recesses formed along the outer circumferential edge of said plate-formed portion of said second magnetic pole plate has a bottom edge extending between the opposite side edges thereof and formed in an arc which is centered at the axis and has the same radius as the radius of inner circumferential faces of said second projections of said second cup shaped member.

6. An electric motor according to claim 3, wherein each of said first additional recesses formed along the outer circumferential edge of said plate-formed portion of said first magnetic pole plate has a bottom edge extending between the opposite side edges thereof and formed in an arch which is centered at the axis and has the same radius as the radius of inner circumferential faces of said first projections of said first cup shaped member while each of said third additional recesses formed along the outer circumferential edge of said plate-formed portion of said second magnetic pole plate has a bottom edge extending between the opposite side edges thereof and formed in an arc which is centered at the axis and has the same radius as the radius of inner circumferential faces of said second projections of said second cup shaped member.

* * * * *